United States Patent

Matsushiro

[11] Patent Number: 5,915,042
[45] Date of Patent: Jun. 22, 1999

[54] CODING AND DECODING METHODS AND APPARATUS FOR COMPRESSING AND EXPANDING IMAGE DATA

[75] Inventor: Nobuhito Matsushiro, Tokyo, Japan

[73] Assignee: Oki Data Corporation, Tokyo, Japan

[21] Appl. No.: 08/806,800

[22] Filed: Mar. 3, 1997

[30] Foreign Application Priority Data

Mar. 28, 1996 [JP] Japan .................................. 8-099256

[51] Int. Cl.⁶ ...................................................... G06K 9/00
[52] U.S. Cl. ........................................... 382/232; 382/181
[58] Field of Search .................................... 382/173, 181, 382/190, 232, 233, 234, 235, 237, 238, 239, 236, 240, 241, 242, 243, 244, 245, 246, 247, 248, 249, 250, 251, 252, 253, 278, 302, 308; 358/429, 430, 462, 467, 448, 426, 455, 465; 341/107, 51

[56] References Cited

U.S. PATENT DOCUMENTS

| | | | |
|---|---|---|---|
| 5,218,457 | 6/1993 | Burkardt et al. | 358/448 |
| 5,313,204 | 5/1994 | Semasa et al. | 341/107 |
| 5,491,564 | 2/1996 | Hongu | 358/429 |

*Primary Examiner*—Leo H. Boudreau
*Assistant Examiner*—Bijan Tadayon
*Attorney, Agent, or Firm*—Panitch Schwarze Jacobs & Nadel P.C.

[57] ABSTRACT

An image is divided into blocks of N consecutive pixels, and each block is coded with reference to M reference pixels, where M and N are integers greater than one. Different patterns of N pixels are obtained from the M reference pixels. If one of these patterns matches the N consecutive pixels sufficiently closely, that block of N consecutive pixels is coded as a flag and a pattern code. When the coded data are decoded, the flags identify blocks that were coded in this way, and these blocks are decoded by copying already-decoded data identified by the pattern codes.

24 Claims, 7 Drawing Sheets

CODING AND DECODING METHODS AND APPARATUS FOR COMPRESSING AND EXPANDING IMAGE DATA

BACKGROUND OF THE INVENTION

The present invention relates to methods and apparatus for compressing and expanding digitized images.

A digitized image comprises picture elements or pixels, each expressed by a certain number of bits of data. Each pixel of a black-and-white image is expressed by just one bit. In a color image, or an image consisting of black, white, and shades of gray, each pixel is expressed by plural bits. As the number of pixels in the image (the image resolution) and the number of bits per pixel (the pixel depth) are increased to improve the quality of the image, the amount of pixel data becomes extremely large, requiring much memory space for storage and much time for transmission. To reduce these requirements, images are frequently compressed by various types of coding.

In one conventional coding method, two consecutive lines of image data are compared. If the two lines of data are identical, an entire line of data can be compressed to a single flag value indicating that the line is identical to the preceding line. In a variation of this conventional method, each line is divided into blocks of consecutive pixels, and each block is compared with the corresponding block in the preceding line, instead of comparing an entire line at a time.

A drawback of these conventional coding methods is that when the two compared lines or blocks are not identical, the data are not compressed at all. Even a minor difference between the two lines or blocks can prevent compression. For most images, the compression ratio is accordingly rather low, especially when the number of pixels per block or line is large, or the pixel depth is large.

SUMMARY OF THE INVENTION

It is accordingly an object of the present invention to improve the compression ratio of image coding methods of the line-comparison and block-comparison type.

To code a line or block of N consecutive pixels in an image, the invented coding method takes a set of M reference pixels from the image, where M and N are integers greater than one. Different patterns of N reference pixels are then obtained from the M reference pixels, and the difference between each pattern of N reference pixels and the N consecutive pixels to be coded is calculated. If a pattern of N reference pixels differing from the N consecutive pixels by less than a certain threshold value is found, the N consecutive pixels are coded as a flag indicating compression, accompanied by a pattern code indicating a specific pattern of N reference pixels that produced a difference less than the threshold value.

To obtain expanded image data from compressed image data that have been coded as above, the invented decoding method reads a flag from the compressed image data, and decides whether the flag indicates compression or non-compression. If the flag indicates compression, a pattern code is read from the compressed image data, then N pixel values are taken from the expanded image data already obtained from the compressed image data, at locations indicated by the pattern code, to obtain N more pixels of expanded image data. If the flag indicates non-compression, the N more pixels of expanded image data are obtained directly from the compressed image data.

The value of M may be greater than N, or less than N. If M is less than N, a pattern of N reference pixels is obtained by using at least one of the M reference pixels twice.

DETAILED DESCRIPTION OF THE INVENTION

Embodiments of the invention will be described with reference to the attached illustrative drawings.

Figure 1:
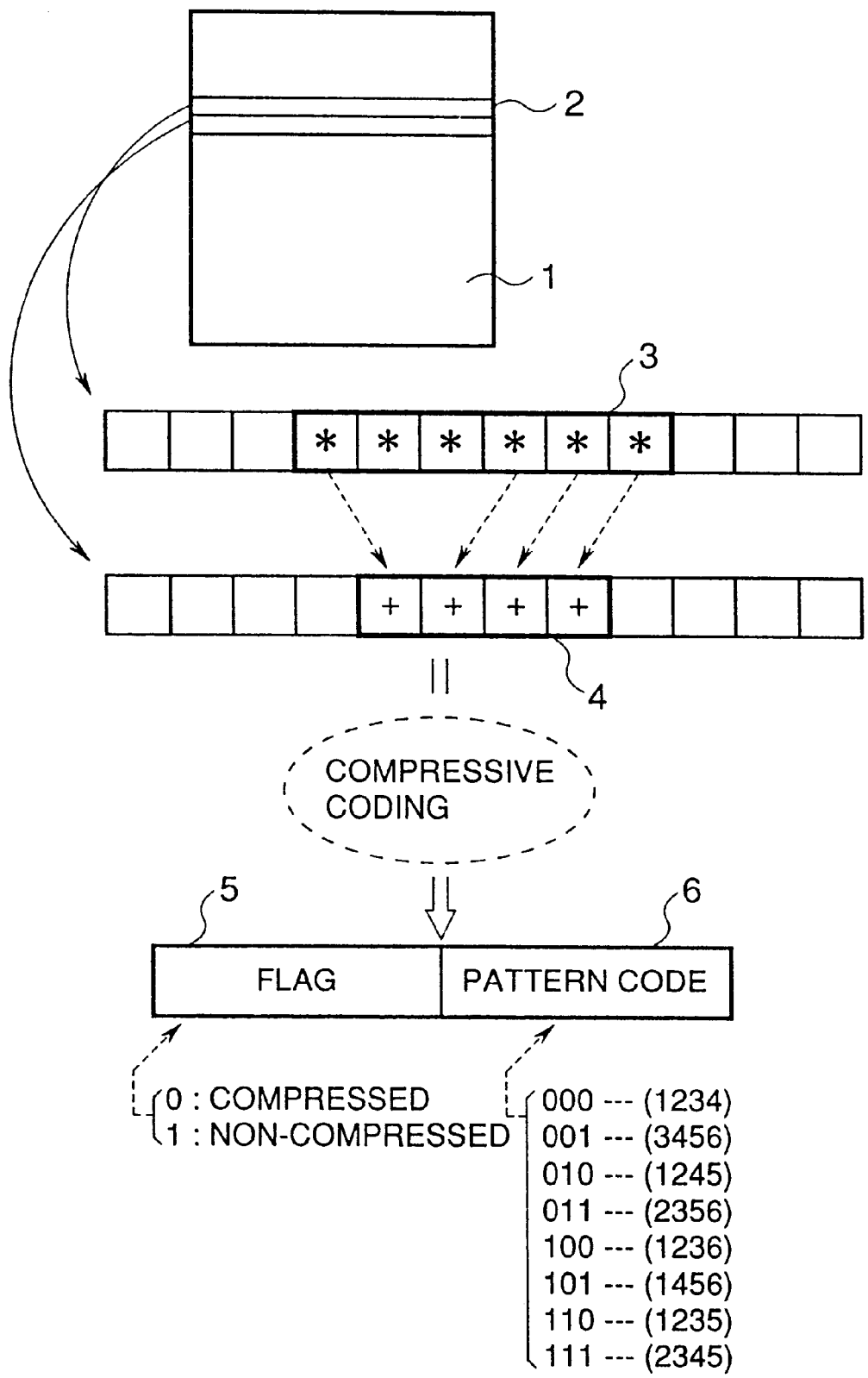
FIG. 1 illustrates the invented coding method.

FIG. 1 schematically illustrates the invented coding method for a case in which the parameter M is equal to six and the parameter N is equal to four. The coding is carried out on a rectangular digitized image 1 comprising successive pixel lines 2. A set of M reference pixels 3, indicated by asterisks (*) in the drawing, is taken from a line that has already been coded. The set of N consecutive pixels 4 to be coded, indicated by crosses (+) in the drawing, is taken from the line immediately below. In the drawing, the M reference pixels 3 comprise the N pixels directly above the N consecutive pixels 4 to be coded, and two additional reference pixels adjacent to the right and left.

The invention is not limited to using this particular set of M reference pixels.

Various patterns, each comprising four (N) reference pixels taken from among the full set of six (M) reference pixels, are compared with the set of four (N) consecutive pixels to be coded. One pattern, for example, comprises the first, fourth, fifth, and sixth reference pixels, which are compared as indicated by the dotted arrows. The compared patterns are drawn from a predetermined collection of, in this case, eight different patterns.

The coded data for the N consecutive pixels 4 comprise a one-bit flag 5 and a three-bit pattern code 6, or the one-bit flag 5 and N pixel values. The flag 5 indicates whether the data have been compressed, a flag value of "zero" indicating compression, for example, and "one" indicating non-compression. When the flag 5 indicates compression, the three-bit pattern code 6 indicates a pattern of N pixels in the set of M reference pixels 3 that closely matches the set of N consecutive pixels 4. The above-mentioned pattern comprising the first, fourth, fifth, and sixth pixels, for example, is indicated by pattern code '101.' If none of the compared patterns match the set of N consecutive pixels 4 closely enough, the flag 5 is set to indicate non-compression, and the pattern code 6 is replaced by the N pixel values themselves.

Figure 2:
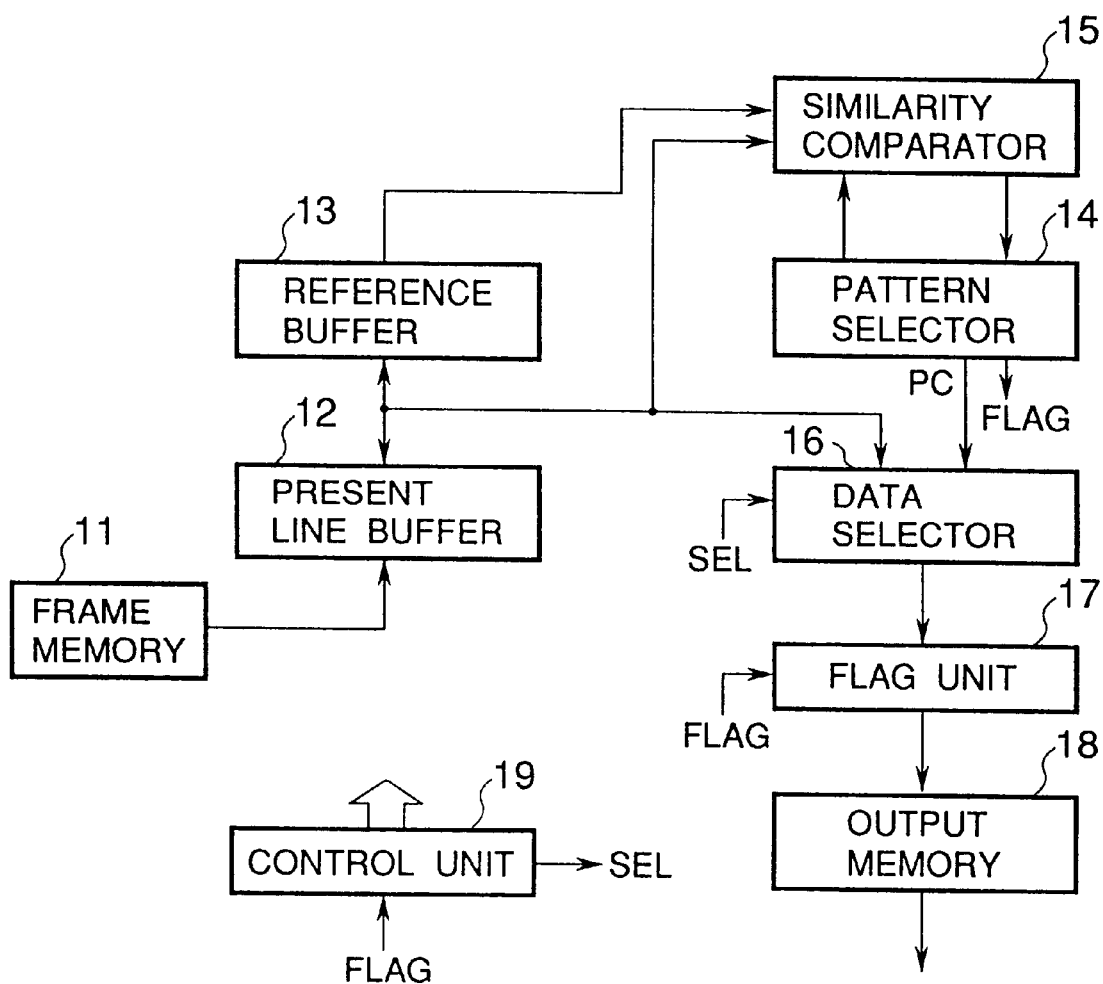
FIG. 2 is a block diagram illustrating an embodiment of the invented coding circuit.

FIG. 2 is a block diagram of a coding circuit that uses a frame memory 11, a present line buffer 12, a reference buffer 13, a pattern selector 14, a similarity comparator 15, a data selector 16, a flag unit 17, an output memory 18, and a control unit 19 to practice the above coding method.

The frame memory 11 stores the rectangular digitized image 1 shown in FIG. 1. The present line buffer 12 stores one pixel line, from which the set of N consecutive pixels 4 to be coded is taken. The reference buffer 13 stores the preceding pixel line. The M reference pixels 3 are taken from the reference buffer 13.

The pattern selector 14 specifies different patterns of N pixels from the M reference pixels 3 in the preceding line. The similarity comparator 15 calculates the difference between each specified pattern and the set of N consecutive pixels in the present line buffer 12. The difference can be calculated as, for example, the sum of the absolute numerical differences between the corresponding pixel values, or the sum of the squares of those differences. The pattern selector 14 receives the difference values from the similarity comparator 15, compares them with a certain threshold value, outputs a selected pattern code (PC) to the data selector 16, and outputs a flag value.

The data selector 16 selects either the pattern code output by the pattern selector 14, or the set of N pixels output from the present line buffer 12, responsive to a selection signal (SEL) received from the control unit 19, and provides the selected data (pattern-code data or pixel data) to the flag unit 17. The flag unit 17 attaches the flag value output by the pattern selector 14 to the data provided by the data selector 16, and stores both flag and data in the output memory 18 as coded image data. The output memory 18 retains the coded image data pending further processing, or pending transmission to or storage in another device.

The control unit 19 receives the flag value from the pattern selector 14, sends the selection signal to the data selector 16, and controls the overall operation of the other units. For example, the control unit 19 controls the copying of pixel data into the two buffers 12 and 13.

Figure 3:
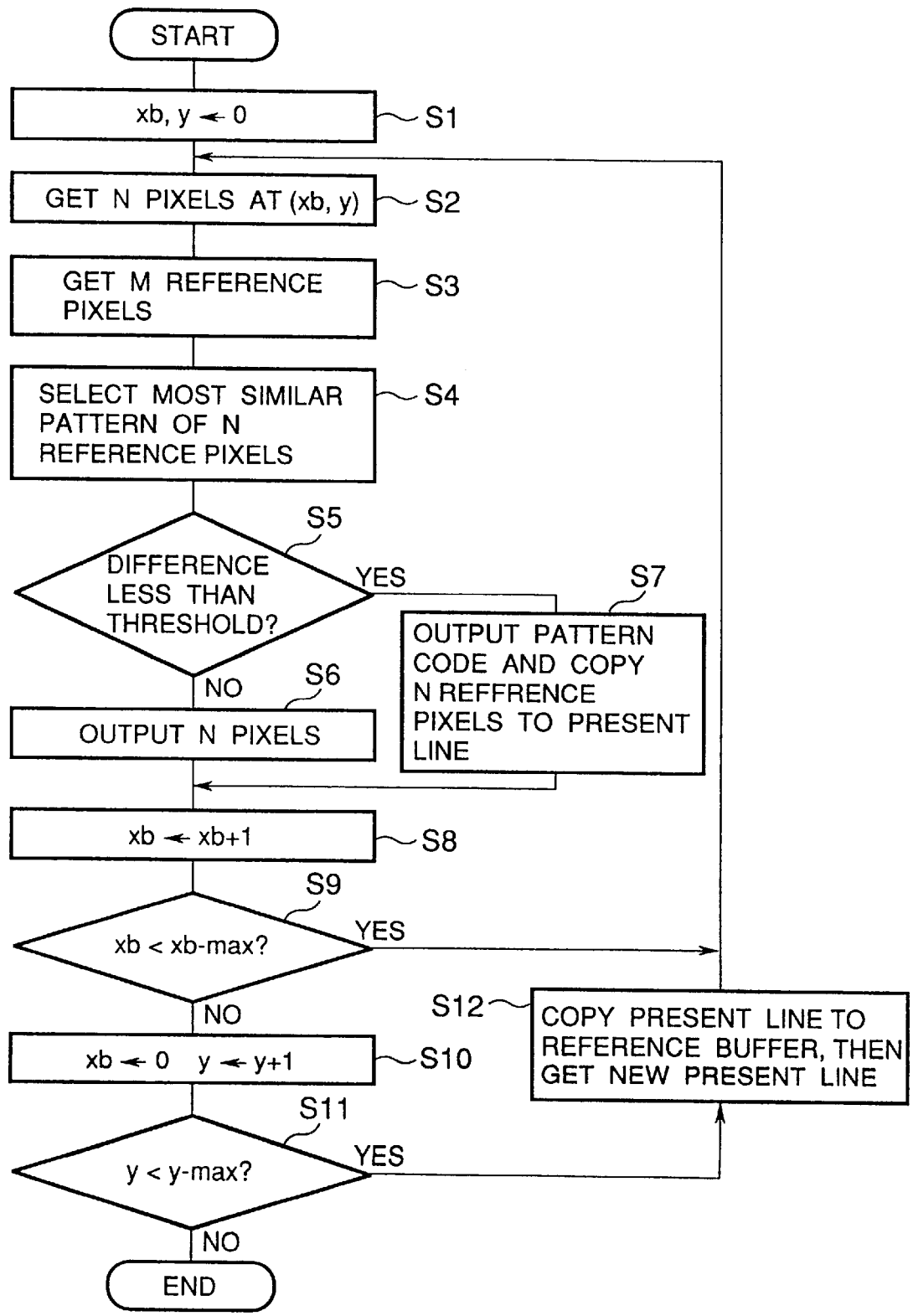
FIG. 3 is a flowchart illustrating the operation of the coding circuit in FIG. 2.

The operation of this coding circuit will now be described with reference to the flowchart in FIG. 3.

After the image data have been stored in the frame memory 11, a pair of location parameters xb and y are initialized to zero (step S1). Parameter xb indicates horizontal location in units of N pixels. Parameter y indicates vertical location, and designates the present line.

At any given time, line y is stored in the present line buffer 12, and line y-1 is stored in the reference buffer 13. When y is zero, designating the first line in the image, predetermined data such as all-zero data are stored in the reference buffer 13.

From the present line buffer 12 and reference buffer 13, the N consecutive pixels starting at location (xb, y) and M reference pixels located in line y-1 are transferred to the similarity comparator 15 (steps S2 and S3). The pattern selector 14 specifies different patterns of N pixels taken from among the M reference pixels, has the similarity comparator 15 calculate the differences of these patterns from the N consecutive pixels received in step S2, and selects a pattern with a minimum difference as the pattern most similar to the N consecutive pixels (step S4). The pattern selector 14 then compares this minimum difference with a threshold value (step S5), sets the flag value to "zero" if the minimum difference is less than the threshold value, and sets the flag value to "one" if the difference is not less than the threshold value.

If the minimum difference is not less than the threshold value, the pixel data of the N pixels taken from the present line buffer 12 in step S2 are output through the data selector 16 to the output memory 18 (step S6). If the difference is less than the threshold, the pattern code output by the pattern selector 14 is output to the output memory 18, then the pattern of N reference pixels designated by that pattern code is copied from the reference buffer 13 to position xb in the present line buffer 12 (step S7). In either case, the flag value is attached to the output data.

The next four steps (steps S8, S9, S10, and S11) are executed by the control unit 19 to repeat steps S2 to S7 for each block of N consecutive pixels in each pixel line in the image 1. These steps S8 to S11 are thought to be self-explanatory, so a detailed description will be omitted. The parameter xb-max denotes the horizontal position of the last block of N pixels in each line. The parameter y-max denotes the last line in the image.

Following a Yes decision in step S11, the control unit 19 copies the entire contents of the present line buffer 12 to the reference buffer 13, then copies a new line from the frame memory 11 into the present line buffer 13 (step S12). The old present line thereby becomes the new preceding line, and the next line becomes the new present line.

The copying performed in steps S7 and S12 assures that the M reference pixels taken from the reference buffer 13 have the same values as the reference pixels that will be used when the compressed data are later expanded by a decoding circuit.

Figure 4:
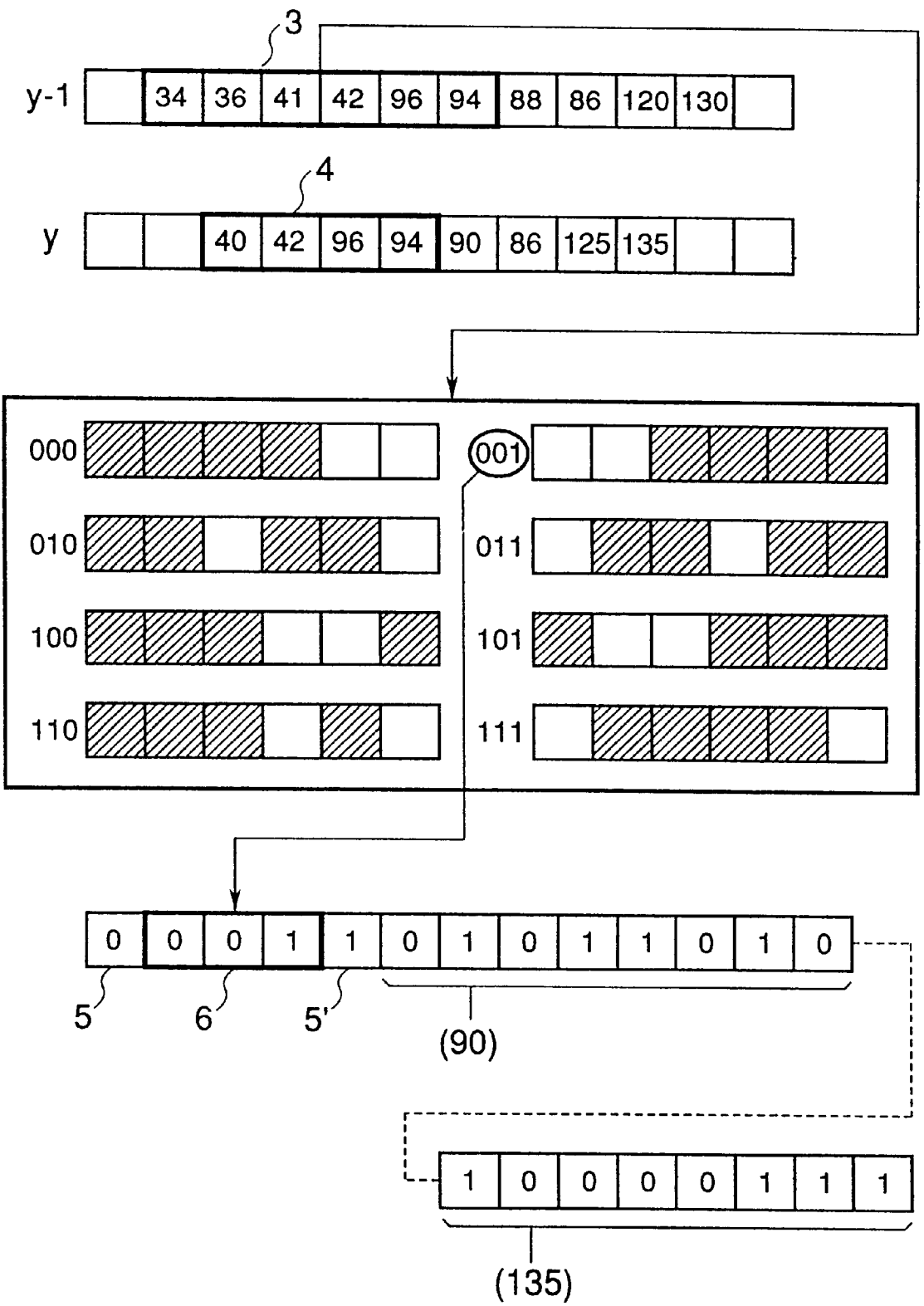
FIG. 4 shows an example of the coding of pixel data.

FIG. 4 shows a specific example of steps S2 to S7 when the pixel depth is eight bits, N is equal to four, M is equal to six, the difference calculation is performed by taking a sum of squares, and the threshold value is equal to two.

Parts of two lines y and y-1 are shown at the top of FIG. 4. To code a set of four consecutive pixels 4 in line y, the pattern selector 14 specifies eight patterns from the set of six reference pixels 3 in line y-1.

The difference between the four consecutive pixels 4 and the reference pattern consisting of the third to sixth reference pixels (the pattern with pattern code '001') is calculated as follows:

$$(40-41)^2+(42-42)^2+(96-96)^2+(94-94)^2=1$$

This is the minimum difference value among the difference values of all eight patterns, and this difference value is less than the threshold value of two, so the four consecutive pixels 4 are coded as a flag bit 5 with a value of "zero" (designating compression), followed by a pattern code 6 with the value '001.'

When the next block of four consecutive pixels in line y (with pixel values of 90, 86, 125, and 135) is compared with patterns in line y-1, the patterns are drawn from a similar set of six reference pixels (having pixel values of 96, 94, 88, 86, 120, and 130). The calculated difference now exceeds the threshold value (two) for all patterns, so this next block of pixels is not compressed. The output of the coding circuit for this block comprises a flag bit 5' with a value of "one" (indicating non-compression), followed by the four pixel values themselves, as illustrated.

When the pixel depth is eight bits and N is equal to four, as in this example, each block of N pixels comprises thirty-two bits of data (4×8=32). When a pattern with a difference less than the threshold value is found, these thirty-two bits are compressed to Just four bits (one flag bit and three pattern code bits), for a compression ratio of 8:1. In the case of non-compression, the flag bit is followed by the N pixel values and the compression ratio is 32:33, the coded data being one bit longer than the original data. If three-fourths of the blocks of N consecutive pixels in the original image 1 can be compressed, the compressed size of the image data will be only about one-third (more precisely, about thirty-five percent) of the original size.

A conventional coding method that compared each block of N consecutive pixels in the present line with only one reference pattern of N pixels in the preceding line, outputting a flag value indicating compression in the case of a perfect match, and otherwise outputting a flag value indicating non-compression followed by the N pixel values themselves, would be able to compress fewer blocks than the present method. If one-fourth of the blocks in an image are compressed by this conventional method, the size of the compressed data is about four-fifths (more precisely, about seventy-eight percent) of the original size. As this example suggests, the compression ratios achieved by the conventional method tend to fall far short of the compression ratios achieved by the present invention, particularly when the pixel depth is large.

In order to reduce the pattern code to three bits, the embodiment illustrated in FIGS. 1 to 4 compared only eight of the fifteen possible patterns comprising four out of six reference pixels. If a four-bit pattern code were to be employed, all fifteen patterns could be compared. Conversely, the pattern code could be reduced to two bits by comparing only four patterns. The optimum length of the pattern code is difficult to specify, because it depends on the type of images being compressed, but in general, the invented method need not test all possible patterns of N out of M reference bits.

Incidentally, when no reference pixels are used twice, the maximum number of patterns is given by the well-known formula $M!/[(M-N)!N!]$, in which the exclamation mark denotes the factorial operation.

Next a decoding circuit that expands the data compressed by the coding circuit in FIG. 2 will be described.

Figure 5:
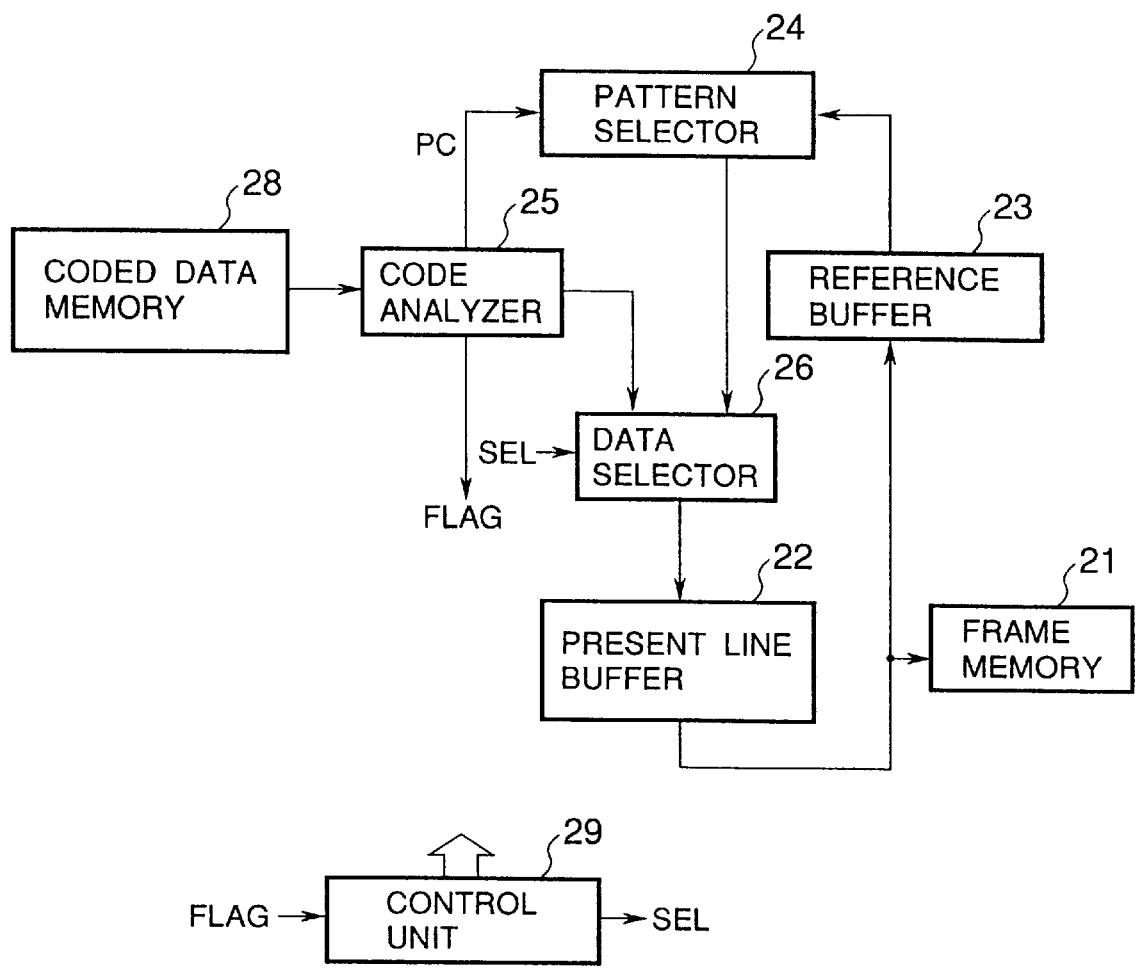
FIG. 5 is a block diagram illustrating an embodiment of the invented decoding circuit.

Referring to FIG. 5, this decoding circuit comprises a frame memory 21, a present line buffer 22, a reference buffer 23, a pattern selector 24, a code analyzer 25, a data selector 26, a coded data memory 28, and a control unit 29.

The coded data memory 28 stores coded data received from the coding circuit in FIG. 2. The coded data are received via, for example, an intervening transmission line or storage device.

The code analyzer 25 analyzes the coded data, sends flag bits to the control unit 29, sends pattern codes (PC) to the pattern selector 24, and sends uncompressed pixel data to the data selector 26. The data selector 26 selects either the pixel data received from the code analyzer 25 or pixel data received from the pattern selector 24, according to a select signal (SEL) received from the control unit 29, and stores the selected data in the present line buffer 22.

The present line buffer 22 stores data for one line, the data being received block by block from the data selector 26. At the end of each line, the contents of the present line buffer 22 are transferred to the frame memory 21 and reference buffer 23. The frame memory 21 stores expanded image data for one entire image. The reference buffer 23 stores expanded image data for one line, this being the line preceding the line stored in the present line buffer 22. Initially, the reference buffer 23 stores predetermined data such as all-zero data.

The pattern selector 24 selects patterns of N pixels each from the contents of the reference buffer 23 according to the pattern code received from the code analyzer 25, and transfers the selected patterns to the data selector 26. The control unit 29 controls the above operations.

Figure 6:
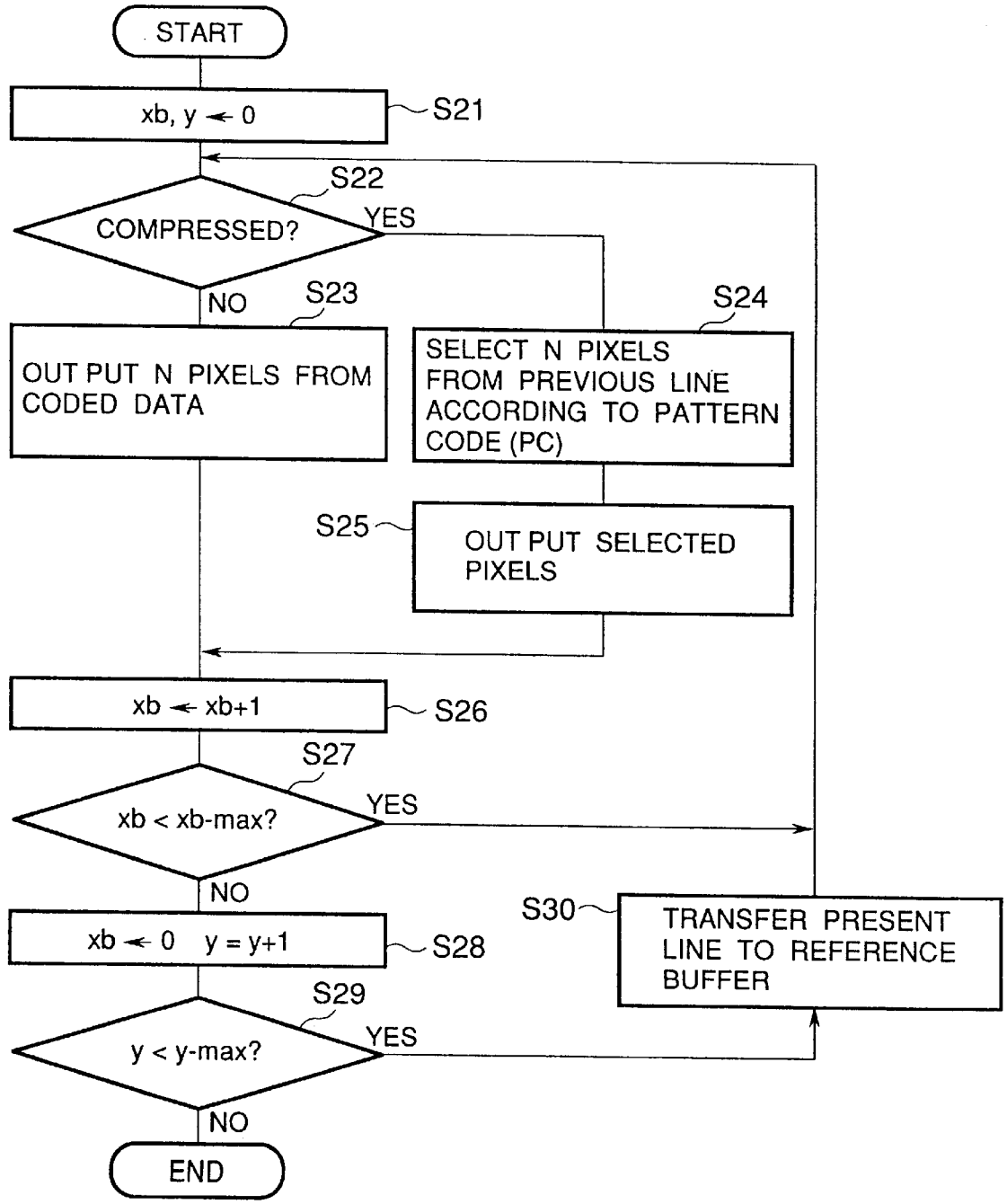
FIG. 6 is a flowchart illustrating the operation of the decoding circuit in FIG. 5.

The operation of this decoding circuit will now be described with reference to the flowchart in FIG. 6.

Initially, a pair of location parameters xb and y are initialized to zero (step S21). These parameters have the same meaning as in FIG. 3.

From a flag bit in the coded data, the code analyzer 25 determines whether the block of N pixels at location xb in line y has been compressed or not (step S22). If the block has not been compressed, the N pixel values in the block are taken directly from the coded data and output through the data selector 26 to the present line buffer 22 (step S23).

If the block has been compressed, the code analyzer 25 sends the pattern code following the flag bit to the pattern selector 24, which selects the corresponding pattern of N pixels from a set of M reference bits in the preceding line (step S24). The position of these M reference bits depends on the value of xb. The values of the pixels in the selected pattern are then output through the data selector 26 to the present line buffer 22 (step S25).

The next four steps (steps S26, S27, S28, and S29) are executed by the control unit 29 to repeat steps S22 to S25 for each block of N consecutive pixels in each image line. Steps S26 to S29 are thought to be self-explanatory, so a detailed description will be omitted. Parameters xb-max and y-max have the same meaning as in FIG. 3.

When a Yes decision is obtained in step S29, indicating the end of a line but not the end of the image, the contents of the present line buffer 22 are transferred to the reference buffer 23 in preparation for the decoding of the next line (step S30).

The expanded image output to the frame memory 21 will not in general be identical to the original image that was coded, but any differences will be limited by the threshold value employed in the coding circuit. If the threshold value is sufficiently small, the differences will usually not be noticeable.

Figure 7:
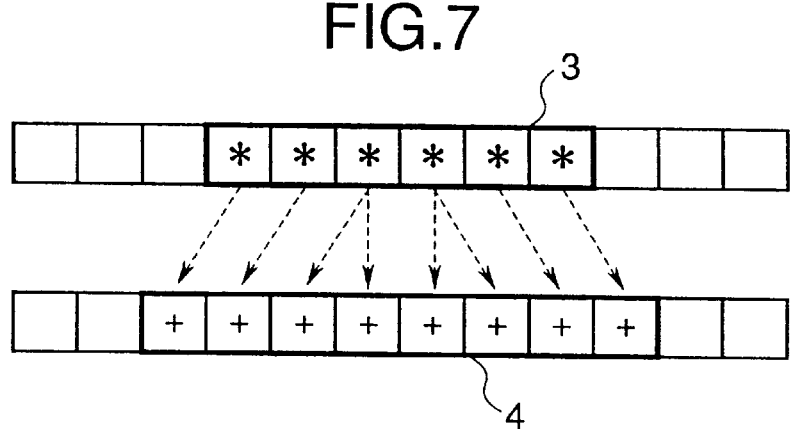
FIG. 7 illustrates the invented coding method when M is less than N.
Figure 8:
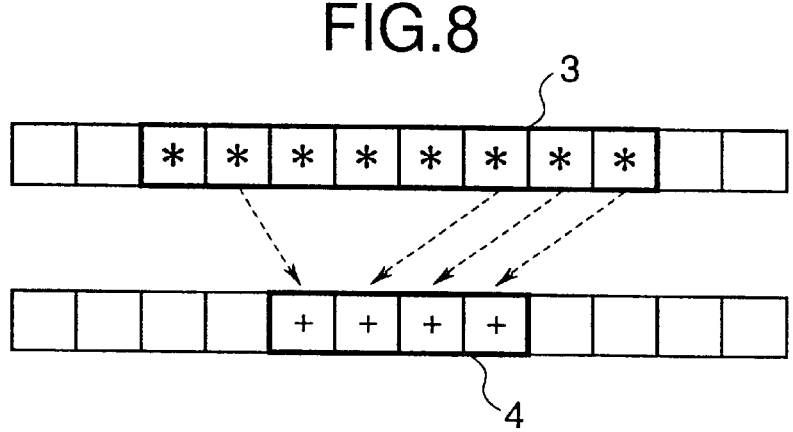
FIG. 8 illustrates the invented coding method when M is eight and N is four.
Figure 9:
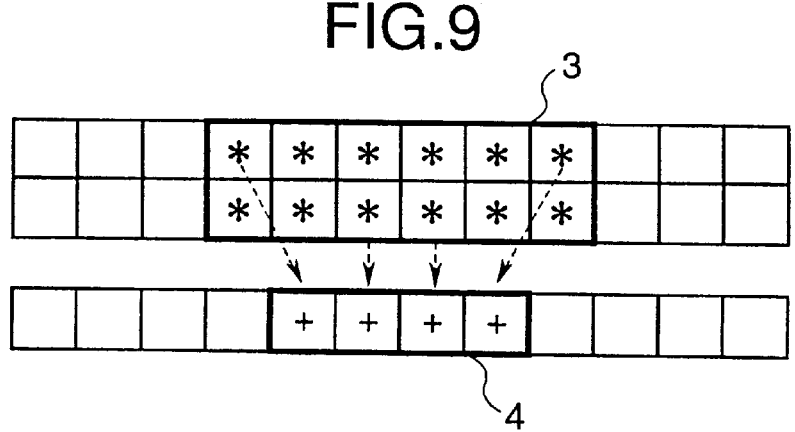
FIG. 9 illustrates the invented coding method when the M reference pixels are taken from two lines.

FIGS. 7, 8, and 9 illustrate variations of the invented coding method, again using asterisks (*) to indicate the M reference pixels and crosses (+) to indicate the block of N consecutive pixels to be coded.

In FIG. 7, M is less than N. Specifically, M is equal to six and N is equal to eight. A pattern of N pixels is obtained from the M reference pixels by using some of the M reference pixels twice, as indicated by the dotted arrows.

Use of the same reference pixel twice in the same pattern is not restricted to the case in which M is less than N. The same technique can be applied when M is equal to or greater than N.

In FIG. 8, M is equal to eight and N is equal to four. If a seven-bit pattern code is employed, then all of the seventy possible patterns comprising four of the eight reference pixels can be compared, substantially improving the probability of finding a pattern with a difference value lower than the threshold value. The seven-bit pattern code and one-bit flag value can be conveniently accommodated on an eight-bit data bus.

If the six least likely patterns are discarded, reducing the number of patterns to sixty-four, then the pattern code can be shortened to six bits, thereby improving the compression ratio. If only the most likely thirty-two patterns are compared, the pattern code can be further shortened to five bits. The optimum pattern code length can be found by experimentation with typical images.

In FIG. 9, M is equal to twelve, and the twelve reference pixels are disposed in the two preceding lines. In this case the reference buffers in the coding circuit and decoding circuit must each store two pixel lines.

There are four hundred ninety-five possible patterns comprising four out of twelve pixels, including patterns with pixels drawn from both preceding lines, as illustrated by the dotted arrows. A nine-bit pattern code would be required if all possible patterns were to be used. To keep the pattern code within the width of an eight-bit data bus, the patterns actually employed can be restricted to a subset of the possible patterns.

Computing devices generally employ data buses with widths that are a multiple of four (such as four, eight, sixteen, or thirty-two). Processing speeds can be improved by using pattern codes with lengths that are likewise a multiple of four, or one less than multiple of four. For the same reason, it is generally desirable for N to be a multiple of four.

When the number of patterns is large, as in FIGS. 8 and 9 for example, the coding circuit can be adapted to stop comparing patterns as soon as a pattern with a difference less than the threshold value is found, without searching for the pattern with the minimum difference. Excessive compression delays can thereby be avoided, although at some loss of image fidelity.

Many other variations are possible, in addition to those illustrated in FIGS. 7 to 9. When the invention is applied to line comparison, for example, the N pixels to be coded may constitute one complete line, and the M reference pixels may constitute two or more preceding lines The invention is of course not limited to the threshold value of two given in the description above. Higher threshold values can be used to improve the compression ratio. There is a trade-off between compression ratio and image fidelity, so the optimum threshold value should be determined through experimentation with typical image data.

Those skilled in the art will recognize that further variations are possible within the scope of the invention as claimed below.

What is claimed is:

1. A method of compressively coding a digitized image made up of pixels, comprising the steps of:

taking a set of M reference pixels from said digitized image, where M is an integer greater than one;

taking a set of N consecutive pixels from said digitized image, where N is an integer greater than one;

comparing different patterns of N reference pixels, each taken from said set of M reference pixels, with said set of N consecutive pixels, and calculating a difference between each compared pattern of N reference pixels and said set of N consecutive pixels; and coding said set of N consecutive pixels as a flag indicating that said set of N consecutive pixels has been compressed and a pattern code indicating one of said patterns of N reference pixels, provided the difference between said set of N consecutive pixels and said one of said patterns of N reference pixels is less than a certain threshold value.

2. The method of claim 1, comprising the further step of coding said set of N consecutive pixels as a flag indicating that said set of N consecutive pixels has not been compressed, accompanied by pixel values of said set of N consecutive pixels, when no pattern of N reference pixels differing by less than said threshold value from said set of N consecutive pixels is found in said step of comparing.

3. The method of claim 1, wherein M is greater than N.

4. The method of claim 3, wherein the patterns compared in said step of comparing are drawn from a collection of patterns comprising at least two different patterns of N pixels in said M reference pixels, but not comprising all possible patterns of N pixels among said M reference pixels.

5. The method of claim 1, wherein M is less than N, and each said compared pattern of N reference pixels is generated by using at least one of said M reference pixels twice.

6. The method of claim 1, wherein said step of comparing stops as soon as a pattern differing from said set of N consecutive pixels by less than said threshold value is found.

7. The method of claim 1, wherein said step of comparing continues until a pattern of N reference pixels differing from said set of N consecutive pixels by a minimum amount is found.

8. The method of claim 1, comprising the further steps of:

storing said set of N consecutive pixels in a first buffer;

replacing said N consecutive pixels in said first buffer with the N reference pixels in the pattern indicated by said pattern code, when said N consecutive pixel values are coded as said flag and said pattern code; and copying contents of said first buffer to a second buffer at certain times, said set of M reference pixels from said second buffer.

9. A method of expanding compressed image data having flags, pattern codes, and pixel values, thereby obtaining expanded image data, comprising the steps of:

reading a flag from said compressed image data, and deciding whether said flag indicates compression or non-compression;

reading N pixel values from said compressed image data, if said flag indicates non-compression, thereby obtaining N pixels of expanded image data, N being a predetermined integer greater than one;

reading a pattern code from said compressed image data, if said flag indicates compression; and reading N pixel values from the expanded image data already obtained from said compressed image data, at locations responsive to said pattern code, thereby obtaining N more pixels of expanded image data, if said flag indicates compression.

10. The method of claim 9, wherein said step of reading N pixel values from the expanded image data reads pixel values from N different locations in said expanded image data.

11. The method of claim 9, wherein said step of reading N pixel values from the expanded image data reads at least two pixel values from a single location in said expanded image data, thereby reading at least one pixel value in said expanded image data twice.

12. The method of claim 9, wherein said step of reading N pixel values from the expanded image data reads N pixel values from one preceding line in said expanded image data.

13. The method of claim 9, wherein said step of reading N pixel values from the expanded image data reads values from more than one preceding line in said expanded image data.

14. A coding circuit for compressively coding digitized image data, comprising:

a first buffer for storing at least N consecutive pixels from said image data, where N is an integer greater than one;

a second buffer for storing at least M reference pixels from said image data, where M is an integer greater than one;

a similarity comparator coupled to said first buffer and said second buffer, for comparing different patterns of N reference pixels, each taken from said M reference pixels, with said N consecutive pixels, and calculating a difference between each compared pattern of N reference pixels and said N consecutive pixels;

a pattern selector coupled to said similarity comparator, for comparing each difference calculated by said similarity comparator with a certain threshold value and outputting a pattern code and a flag, said flag having a first value when a pattern of N reference pixels differing by less than said threshold value from said N consecutive pixels was found by said similarity comparator, said flag having a second value when no pattern of N reference pixels differing by less than said threshold value from said N consecutive pixels was found by said similarity comparator, and said pattern code identifying a pattern of N reference pixels differing by less than said threshold value from said N consecutive pixels, if such a pattern was found;

a data selector coupled to said pattern selector, for selecting data equal to said pattern code when said flag has said first value, and selecting data equal to said N consecutive pixels in said first buffer when said flag has said second value; and an output memory coupled to said data selector, for storing the flag output by said pattern selector and the data selected by said data selector.

15. The coding circuit of claim 14, wherein M is greater than N.

16. The coding circuit of claim 15, wherein the patterns compared by said similarity comparator are drawn from a collection of patterns comprising at least two different patterns of N pixels in said M reference pixels, but not comprising all possible patterns of N pixels among said M reference pixels.

17. The coding circuit of claim 14, wherein M is less than N, and each said pattern of N reference pixels is generated by using at least one of said M reference pixels twice.

18. The coding circuit of claim 14, wherein said pattern selector 14 selects a pattern of N reference pixels differing by a minimum amount from said N consecutive pixels, and outputs the pattern code thereof, provided said minimum amount is less than said threshold value.

19. The coding circuit of claim 14, further comprising a control unit for copying said pattern of N reference pixels from said second buffer to said first buffer when said flag has said first value, and copying contents of said first buffer to said second buffer at certain intervals.

20. A decoding circuit for expanding compressed image data having flags indicating compression and non-compression, pattern codes, and pixel values, thereby obtaining expanded image data, comprising:

a code analyzer for reading a flag from said compressed image data, and deciding whether said flag indicates compression or non-compression, reading a pattern code from said compressed image data if said flag indicates compression, and reading N pixel values from said compressed image data, if said flag indicates non-compression, N being a predetermined integer greater than one; and a pattern selector coupled to said code analyzer, for reading N pixel values from the expanded image data already obtained from said compressed image data, at locations responsive to said pattern code, thereby obtaining N more pixels of expanded image data, if said flag indicates compression.

21. The decoding circuit of claim 20, wherein said pattern selector reads pixel values from N different locations in said expanded image data.

22. The decoding circuit of claim 20, wherein said pattern selector reads at least two pixel values from a single location in said expanded image data, thereby reading at least one pixel value in said expanded image data twice.

23. The decoding circuit of claim 20, wherein said pattern selector reads pixel values from one preceding line in said expanded image data.

24. The decoding circuit of claim 20, wherein said pattern selector reads pixel values from more than one preceding line in said expanded image data.

* * * * *